Dec. 13, 1955     R. R. CROOKSTON ET AL     2,726,846
CATHEAD ASSEMBLY
Filed Nov. 13, 1953
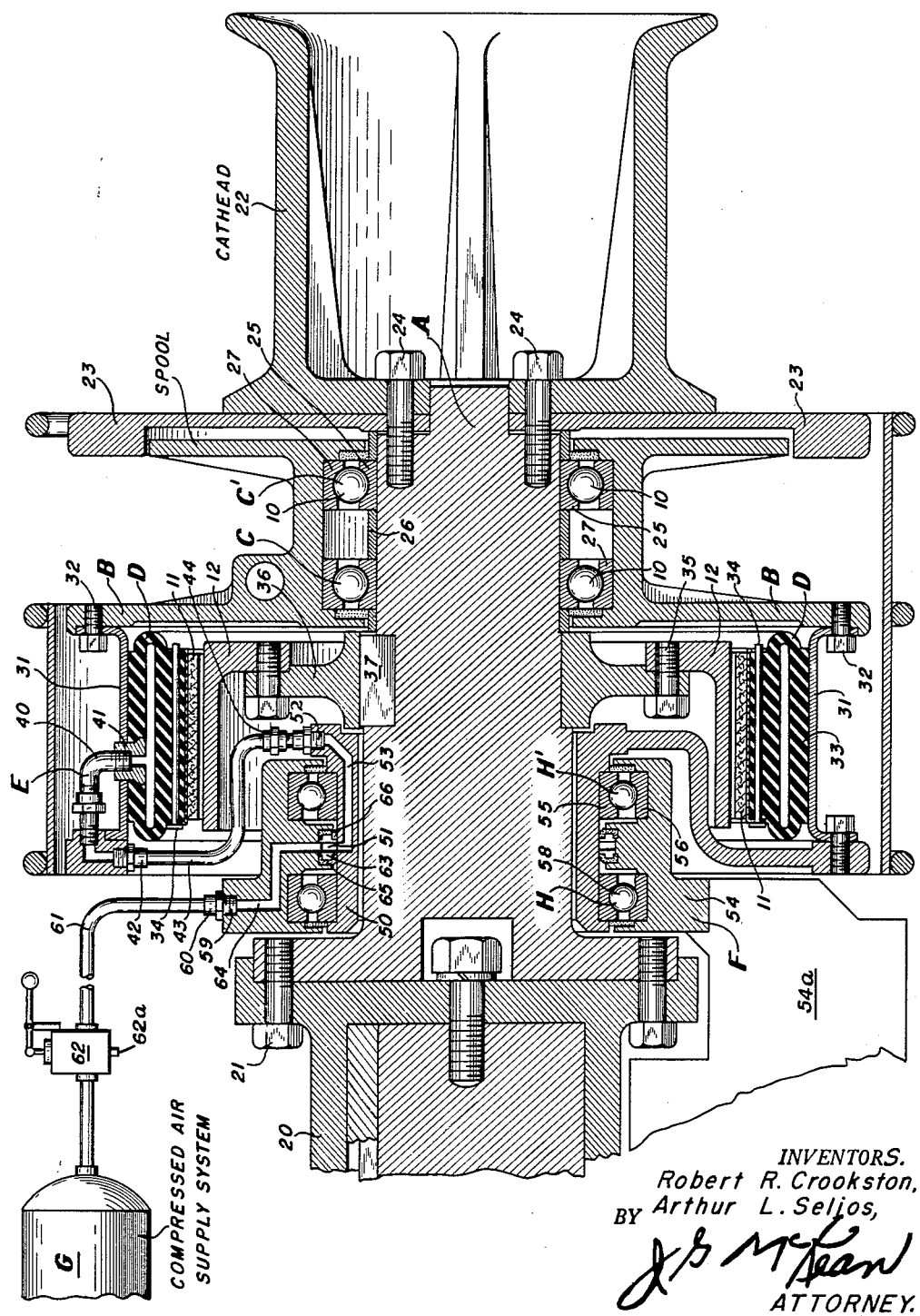
INVENTORS.
Robert R. Crookston,
BY Arthur L. Seljos,
ATTORNEY.

United States Patent Office 2,726,846
Patented Dec. 13, 1955

2,726,846

CATHEAD ASSEMBLY

Robert R. Crookston and Arthur L. Seljos, Houston, Tex., assignors, by mesne assignments, to Esso Research and Engineering Company, Elizabeth, N. J., a corporation of Delaware Application November 13, 1953, Serial No. 391,838

1 Claim. (Cl. 254—187)

The present invention is directed to a cathead assembly having an air actuated friction clutch for releasably engaging a spool with a driven shaft.

Other objects and advantages of the present invention will be seen from the following detailed description taken in conjunction with the drawing in which the sole figure is in the form of an elevation, partly in section, showing an embodiment of the present invention.

Turning now specifically to the drawing, the principal parts of the assembly consist of a driven shaft A, a spool B mounted on shaft A by means of roller type bearing assemblies C, C', a friction clutch assembly D consisting of a friction member 11 carried by spool B and a friction member 12 mechanically connected to driven shaft A. An air actuated assembly E is arranged for bringing member 11 of clutch assembly D into releasable engagement with member 12. An assembly F mounted co-axially around shaft A and out of contact therewith is arranged for conveying compressed air from a suitable source of compressed air G to air actuating means E.

Shaft A is designed to be rotated continuously by a prime mover. In the drawing one end of the shaft is co-axially attached to shaft 20 by means of stud bolts 21. It will be understood that shaft 20 in turn is adapted to be rotated by a suitable prime mover and may, for example, be directly connected to a steam engine for such continuous rotation. Secured to the other end of driven shaft A is a cathead 22 and a guard 23, these units being secured to shaft A by suitable stud bolts 24.

The rolling contact bearing assemblies C, C' by means of which spool B is mounted on shaft A as shown in the drawing each consist of ball bearings 10, races 25 and 27. Races 25 are separated by spacing ring 26 and make a pressed fit with shaft A for rotation therewith. Races 27 are secured to spool B and races 25 are secured to shaft A. Races 25 and 27 cooperate to retain ball bearings 10 in position. Thus, spool B is mounted on driven shaft A by means of anti-friction bearing assemblies.

An annular shaped housing 31 is arranged within guard 23 and is attached to spool B by cap screws 32. Housing 31 serves as a mounting means for the air actuating means E which brings member 11 of friction clutch D into contact with member 12.

The air actuating means E consists of a flattened annularly shaped flexible container 33 which has its outer circumference in contact with and secured to the inner circumferential surface of housing 31 by suitable means, such as vulcanization or cementing, which is not shown in the drawing in order to simplify the showing of the drawing. Contacting member 11 is attached to flexible container 33 by pins 34. Friction member 12 of clutch assembly D is formed as a metal member of generally annular shape having an inwardly extending flange which in turn is secured by cap screws 35 to ring member 36 which is mounted on driven shaft A and is secured thereto by key 37 for rotation therewith.

The means for supplying compressed air to assembly E consists of fitting 40 one end of which passes through an opening 41 in housing 31 and is secured thereto by suitable screw threads so that the end of the fitting discharges into the interior of member 33. Fitting 40 has its other end connected by suitable screw threads to a passageway 40' defined by annual member 31 which is in turn connected by fitting 42, conduit 43 to fitting 44 which is a part of assembly G.

Assembly G serves the purpose of conveying air to conduit 43. In this assembly is sleeve 50 mounted co-axially around shaft A and out of contact therewith. Sleeve 50 has a circumferential groove 51 and a threaded outlet port 52 to which fitting 44 is attached by suitable screw threads. Outlet port 52 is connected with circumferential groove 51 by means of passage 53. A ring shaped member 54 is mounted on sleeve 50 by means of a pair of laterally spaced roller contact bearing assemblies H, H'. Ring member 54 is supported by member 54a to which ring member 54 is attached as shown. Member 54a provides support and particularly allows the member 54 to be mounted co-axially around shaft A and out of contact therewith. Each bearing assembly H and H' consists of a race 55 which makes a press fit with and rotates with sleeve 50 and an outer race 56 which is secured in fixed relation to ring member 54. Between inner and outer races 55 and 56 of each bearing assembly are a plurality of roller bearings 58. Ring member 54 has an inlet port 59 to which is attached a fitting 60 by screw threads. A conduit 61 having a bleeder type valve 62 connects fitting 60 to a suitable source of compressed air G. Ring member 54 has a circumferential groove 63 between the two rolling contact bearing assemblies H and H', said annular groove communicating with corresponding circumferential groove 51 of sleeve 50 and communicating with inlet port 59 through passage 64. Mounted in annular groove 63 is a pair of sealing members 65 and 66, the inner circumference of sealing rings 65 and 66 making sealing contact with sleeve 50 and the outer circumference of sealing rings 65 and 66 making sealing contact with ring member 54 thereby preventing leakage of compressed air as it passes from inlet port 59 to outlet port 52.

The device of the present application is particularly adapted for service in conjunction with rotary type drilling rigs for drilling boreholes. In such type of operation shaft A with cathead 22 mounted thereon rotates continuously while it is desired that spool B rotate only a small portion of the time. When spool B is to be rotated with shaft A it is engaged therewith by allowing air to pass from compressed air supply G by opening valve 62 in conduit 61 whereupon the air passes through inlet port 59, passage 64, circumferential grooves 63 and 51, passage 53, outlet port 52, fitting 44, conduit 43, fittings 42 and 40 to compressed air actuating member 33 whereupon the friction surfaces 11 and 12 of clutch assembly D are engaged and cathead B rotates with and at the same speed as shaft A. When it is no longer desired that the spool be rotated, valve 62 is closed thereupon shutting off the supply of compressed air to the unit and bleeding the compressed air out of line 61 and connecting lines thereto by bleeder-type valve 62 and conduit 62a thereby causing friction members 11 and 12 to disengage. When clutch D is engaged sleeve member 50 rotates and thus the compressed air is brought in through ring member 54 which is stationary and then passes to the rotating parts at which time sleeve 50 rotates with respect to sealing members 55 and 56. However, when the clutch assembly D is disengaged, as occurs most of the time, under which circumstances spool B remains stationary there is no relative movement between sleeve 50 and sealing members 65 and 66. Thus, the period during which there is an opportunity for frictional wear on sealing members 65 and 66 is a relatively small proportion of the total amount of time the shaft A and cathead 22 rotated which makes for long wear of the sealing members 65 and 66. The rolling contact bearing assemblies H, H' which carry ring member 54 and the rolling contact bearing assemblies C, C' which carry spool member B inherently withstand a great deal of shock and thus cause the assembly to be particularly trouble-free when subjected to conditions of hard field use.

The invention of the present application being fully described and illustrated, what is desired to be claimed as Letters Patent is:

A cathead assembly comprising, in combination, a drive shaft adapted to be secured to a prime mover for continuous rotation, a supporting member adjacent said drive shaft, a cylindrical sleeve carried by said supporting member and mounted coaxially around said shaft and out of contact therewith and having a first circumferential groove on its outer cylindrical surface, said sleeve being provided with an outlet port laterally spaced from said first circumferential groove and a passage connecting said first circumferential groove with said outlet port, a ring member carried by a pair of spaced rolling contact bearing assemblies on said sleeve with a second circumferential passage between said rolling contact bearing assemblies in continuous circumferential communication with the first circumferential groove of said sleeve and having an air inlet port connected with said second circumferential groove by a fluid passageway, a pair of spaced seal members mounted between said ring member and said sleeve and continuously circumferentially contacting said sleeve and said ring member to make a fluid-tight seal with said first and second circumferential grooves between said spaced seal members, a spool member carried on said shaft by rolling contact bearings, means mechanically connecting said spool member with said sleeve, a friction clutch assembly having a first friction member mechanically attached to said spool member and a second friction member mechanically attached to said driven shaft, air actuated means carried by said spool member arranged to bring said first clutch member into friction engagement with said second clutch member and a conduit connecting said air actuated means with the outlet port of said sleeve.

References Cited in the file of this patent

UNITED STATES PATENTS

| | | |
|---|---|---|
| 2,640,683 | Long | June 2, 1953 |
| 2,640,684 | Long | June 2, 1953 |
| 2,665,113 | Foster | Jan. 5, 1954 |